US010123258B2

(12) United States Patent
Karlsson et al.

(10) Patent No.: US 10,123,258 B2
(45) Date of Patent: Nov. 6, 2018

(54) METHOD OF ENABLING A WIRELESS INFORMATION DEVICE TO ACCESS THE PRESENCE INFORMATION OF SEVERAL ENTITIES

(75) Inventors: Petter Karlsson, London (GB); Dominic Butler, London (GB)

(73) Assignee: Conversant Wireless Licensing S.a r.l., Luxembourg (LU)

( * ) Notice: Subject to any disclaimer, the term of this patent is extended or adjusted under 35 U.S.C. 154(b) by 191 days.

(21) Appl. No.: 11/556,890

(22) Filed: Nov. 6, 2006

(65) Prior Publication Data
US 2007/0087731 A1      Apr. 19, 2007

Related U.S. Application Data

(63) Continuation of application No. 10/503,348, filed as application No. PCT/GB03/00422 on Feb. 3, 2003, now abandoned.

(30) Foreign Application Priority Data

Feb. 1, 2002    (GB) .................................. 0202370.3

(51) Int. Cl.
*H04W 8/00* (2009.01)
*H04W 48/16* (2009.01)
(Continued)

(52) U.S. Cl.
CPC .............. *H04W 48/16* (2013.01); *H04L 67/24* (2013.01); *H04M 3/42* (2013.01); *H04M 3/4938* (2013.01);
(Continued)

(58) Field of Classification Search
CPC ............... H04L 12/581; H04L 12/5815; H04L 29/08684; G08B 5/223
(Continued)

(56) References Cited

U.S. PATENT DOCUMENTS 6,052,122 A  *  4/2000  Sutcliffe ................ G06Q 30/02
                                                  707/999.003
6,366,915 B1 *  4/2002  Rubert .............. G06F 17/30545
                                                         707/770
(Continued)

FOREIGN PATENT DOCUMENTS

EP      1 176 840 A1    1/2002
GB      2 368 498 A     5/2002
(Continued)

OTHER PUBLICATIONS

Translation of Office Action, dated Jul. 22, 2008, issued in corresponding Japanese Application No. 2003-565155.
(Continued)

*Primary Examiner* — Wen Huang
(74) *Attorney, Agent, or Firm* — Conversant Wireless Licensing

(57) ABSTRACT

The method allows a user to define groups of entities that will be queried automatically for Presence information by his wireless information device. The user, once he has selected the group to be queried, need do no more than select at one time a 'Pinging' function using an on-screen dialog or other menu, which initiates the automatic querying. There is no need to manually query each member of the group for its Presence information.

12 Claims, 5 Drawing Sheets

(51) Int. Cl.
   *H04M 3/42* (2006.01)
   *H04M 3/493* (2006.01)
   *H04L 29/08* (2006.01)
   *H04W 8/24* (2009.01)
   *H04W 48/08* (2009.01)

(52) U.S. Cl.
   CPC .... *H04M 3/42093* (2013.01); *H04M 3/42365* (2013.01); *H04W 8/24* (2013.01); *H04W 48/08* (2013.01)

(58) Field of Classification Search
   USPC ............................. 455/518, 517, 519, 421
   See application file for complete search history.

(56) References Cited

U.S. PATENT DOCUMENTS

| | | | | |
|---|---|---|---|---|
| 6,484,162 | B1* | 11/2002 | Edlund et al. | |
| 6,512,930 | B2* | 1/2003 | Sandegren | 455/518 |
| 6,564,261 | B1* | 5/2003 | Gudjonsson | H04L 12/1818 370/261 |
| 6,687,357 | B1* | 2/2004 | Sakaue | H04M 3/436 370/261 |
| 6,701,309 | B1* | 3/2004 | Beeferman | G06F 17/30646 |
| 6,716,101 | B1* | 4/2004 | Meadows et al. | 455/456.1 |
| 6,968,179 | B1* | 11/2005 | De Vries | H04L 12/5895 455/414.1 |
| 7,085,806 | B1* | 8/2006 | Shapira | G06Q 30/08 705/1.1 |
| 7,092,936 | B1* | 8/2006 | Alonso | G06F 17/30672 707/737 |
| 7,130,611 | B2* | 10/2006 | Kimura | G08G 1/0962 455/404.2 |
| 7,139,827 | B1* | 11/2006 | Iwayama et al. | 709/227 |
| 7,284,033 | B2* | 10/2007 | Jhanji | 709/206 |
| 8,005,911 | B2* | 8/2011 | Jhanji | 709/206 |
| 8,385,964 | B2* | 2/2013 | Haney | 455/519 |
| 2001/0005859 | A1* | 6/2001 | Okuyama | H04L 29/00 709/245 |
| 2001/0027111 | A1 | 10/2001 | Motegi et al. | |
| 2001/0042095 | A1* | 11/2001 | Kim et al. | 709/204 |
| 2002/0056000 | A1* | 5/2002 | Albert Coussement | 709/225 |
| 2002/0059222 | A1* | 5/2002 | Sasaki | G06Q 10/10 707/999.005 |
| 2002/0103806 | A1* | 8/2002 | Yamanoue | 707/100 |
| 2003/0046296 | A1* | 3/2003 | Doss et al. | 707/102 |
| 2003/0065788 | A1* | 4/2003 | Salomaki | 709/227 |
| 2003/0109265 | A1* | 6/2003 | Yamamoto et al. | 455/456 |
| 2004/0152477 | A1* | 8/2004 | Wu et al. | 455/466 |
| 2005/0004984 | A1* | 1/2005 | Simpson | 709/205 |

FOREIGN PATENT DOCUMENTS

| | | |
|---|---|---|
| WO | WO-99/34628 A1 | 7/1999 |
| WO | WO 00/22860 | 4/2000 |

OTHER PUBLICATIONS

Calsyn et al., "Presence Information Protocol Requirements" [online] [retrieved Dec. 3, 2010]. Retrieved from the Internet: <http://tools.ietf.org/html/draft-dusseault-pipr-00>. 27 pages.

International Search Report from International Appl. No. PCT/GB03/00422, dated May 19, 2003.

Search Report from UK Patent Appl. No. 0302425.4, dated Jul. 9, 2003.

Office Action for Japanese Application No. 2003-565155 dated Dec. 21, 2010.

* cited by examiner

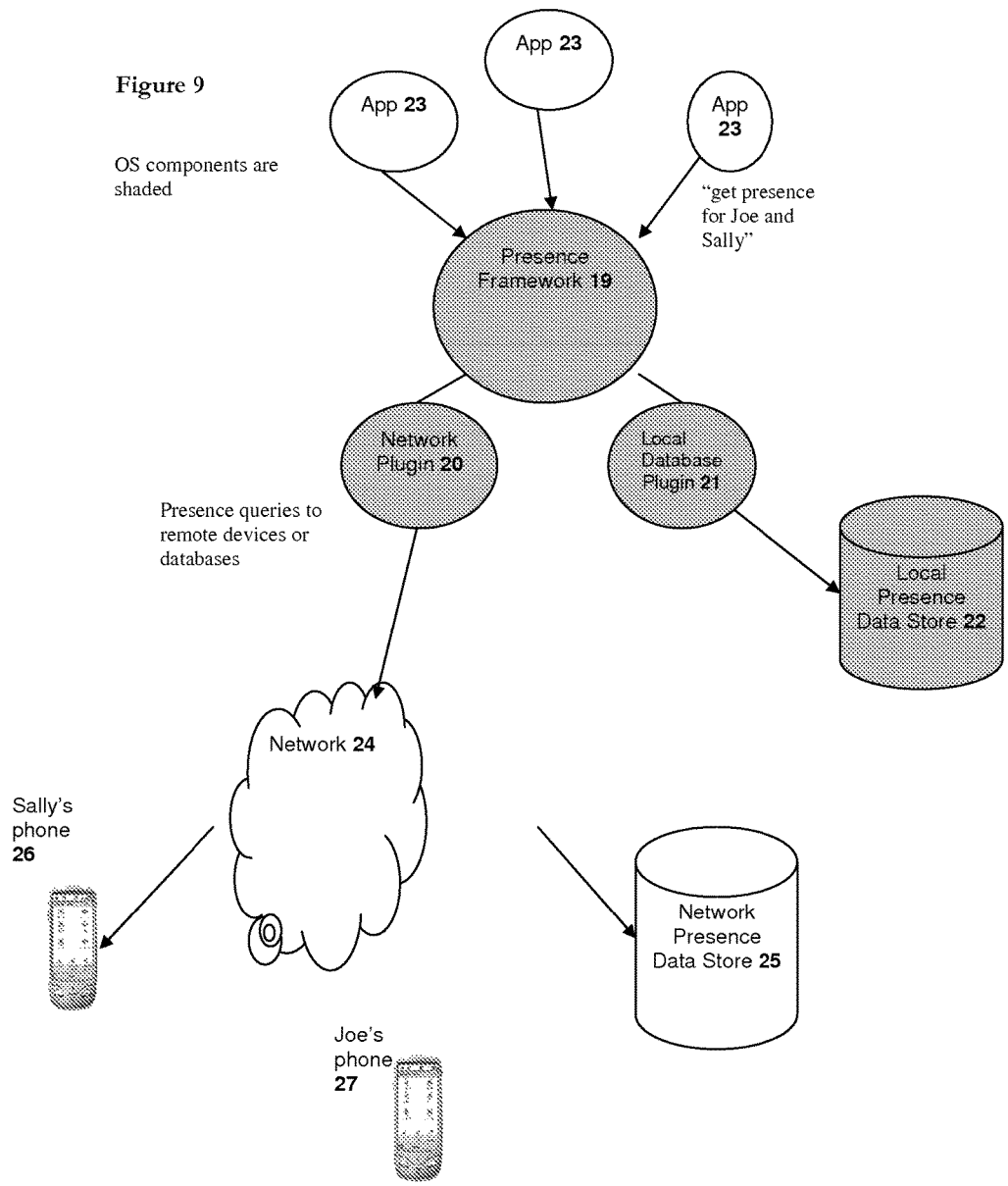

METHOD OF ENABLING A WIRELESS INFORMATION DEVICE TO ACCESS THE PRESENCE INFORMATION OF SEVERAL ENTITIES

CROSS-REFERENCE TO RELATED APPLICATIONS

This is a continuation of U.S. application Ser. No. 10/503,348, filed May 13, 2005, which is the U.S. National Stage of International Application No. PCT/GB03/0422, filed Feb. 3, 2003, which is based on and claims priority to GB Application No. 0202370.3, filed on Feb. 1, 2002.

BACKGROUND OF THE INVENTION

1. Field of the Invention

This invention relates to a method of enabling a wireless information device to access the Presence information of several entities. 'Presence' information refers to private user data which gives information and hints about the current state of a user of a wireless information device, including location, availability and mood. The term 'wireless information device' used in this patent specification should be expansively construed to cover any kind of device with one or two way communications capabilities and includes without limitation radio telephones, smart phones, communicators, personal computers, computers and application specific devices. It includes devices able to communicate in any manner over any kind of network, such as GSM or UMTS mobile radio, Bluetooth™, Internet etc.

2. Description of the Prior Art

Current generation wired and wireless telephones can indicate to a caller the status of a call recipient in only crude and potentially ambiguous terms: for example, when a caller makes a voice call, he or she might receive one of five different responses: (a) the desired call recipient answers; (b) there is no answer; (c) there is an engaged tone; (d) the call gets put through to a pre-recorded voice mail message or (e) the call gets diverted to someone else. If the intended call recipient does not actually answer the call, then the caller has no idea why the call was not answered: for example, is the intended recipient in fact there but too busy to answer? Could a different number have been dialled to connect successfully?

Conventional so-called 'Presence' systems are the subject of considerable interest at present and partly solve the above problems. The intent of Presence systems is to show the status of the prospective call recipient to a calling party ahead of the caller making the call—for example, giving information about whether the intended call recipient is busy, in a meeting, contactable on a mobile phone or land line, giving hints about the way the call recipient would prefer to be contacted (voice, SMS etc). Reference may be made to RFC 2778 'A Model for Presence and Instant Messaging' February 2000, The Internet Society.

Presence information will typically be stored on one or more servers controlled by a wireless operator; people can post their Presence information onto these servers directly from their own wireless information devices; some kinds of Presence information may also be determined automatically, such as the location of the device. Someone seeking Presence information relating to (or 'owned') by another can access these servers. Peer to peer variants are also possible, with an individual storing his or her Presence information on his or her own wireless information device, which can give access to that information to other wireless information device or servers that wish to pull down this information. Reference may be made to PCT/GB01/03784 filed by the present applicant, which describes a comprehensive Presence architecture and is incorporated by reference into this disclosure. Further reference may also be made to PCT/GB01/03804 again filed by Symbian Limited, which discloses an extensible database architecture suitable for the fast and efficient deployment of Presence related systems and is again incorporated by reference into this disclosure.

Presence information can potentially be very useful in social situations, such as where an individual simply feels like talking to a friend: he can then manually and sequentially query the Presence information of his friends and avoid those who have posted Presence information such as 'In a meeting' or 'Don't Disturb'. Querying another's Presence information will typically be done through a simple dialog screen, for example on the contacts application running on the wireless information device of the above individual, there could be a menu listing different communications options that can be initiated when a particular person's contact record is being viewed—e.g. 'call' (to place a voice call to that person); 'message' (to write and send a SMS text message to that person); and 'Get Presence' (to obtain the Presence information of that person). Using the 'Get Presence' option separately for each person in turn that he might like to talk to, he perhaps finds a friend who has posted the Presence information 'Bored' and he can then initiate a voice call with that person. The process of sequentially and manually checking Presence information is however quite slow.

SUMMARY OF THE PRESENT INVENTION

In a first aspect of the present invention, there is a method of enabling a wireless information device to access Presence information of several entities, comprising the following steps:
 (a) storing Presence information for several entities at one or more data stores and making that information accessible;
 (b) automatically sending, from the or each data store to the wireless information device, Presence information for entities which meet criteria defined or selected by a user of the wireless information device, the criteria potentially covering several such entities, and the sending of the information occurring in response to the user singly selecting an option displayed on the device.

Hence, users can automatically initiate a pull down of Presence information from several entities through a single action, as opposed to having to sequentially open the contact record for each entity and select a 'Get Presence' type option for each entity. This is also different from automatically and instantly pushing changed Presence information to all users in a pre-defined group (e.g. pushing an entity's Presence information to all persons listed as 'friends' in that entity's contacts list, including all changes to that Presence information), which is potentially far more costly since it results in Presence data traffic that may be superfluous.

The criteria defined or selected by the user may be that the entities are a member of a pre-defined category of contacts of the user, each category being populated with one or more entities. For example, typical categories might include:
 close family; extended family; close friends; football friends; book club friends;
 clubbing friends; cinema friends; shopping friends; class mates; work colleagues; work colleagues in dept A; work colleagues in dept B with skills C etc. etc.

These criteria could be listed in a menu option on the user's device (e.g. within the contacts or messaging application) and also be user definable to enable new categories to be created as needed. The device would automatically send, to the data store storing Presence information for each entity satisfying the defined criteria, a request to return the relevant Presence information. This would happen on user initiation by, for example, the user selecting the 'Get Presence' option from a dialog box or other kind of menu. Because that 'Get Presence' selection is automatically applied to all entities meeting the defined criteria, a user could poll, for example, all members of the 'class mates' category for their Presence with just a single process, instead of having to repeat that process for each individual class mate.

The criteria defined or selected by the user may be that the Presence information itself meets criteria defined or selected by the user. These criteria could again be listed within the contacts or messaging application. For example, if the user wants to plan a social engagement with a friend, the criteria might be to exclude entities with Presence information for moods/activities including 'in meeting', 'at work', 'busy', or to include only entities with Presence information that include the 'Free for lunch' status or similar Presence information. This approach may require Presence information to be selected from standard options used by all entities, rather than for entities to be able to free script their status. It might also be satisfied by a query engine using a degree of AI, which could interpret free scripted status messages. The Presence information sent to the requesting wireless information device may be a simple answer (e.g. 'yes' or 'no') to whether there is a match to criteria sent by the device. Or it may be the Presence information actually stored (e.g. in response to a query "What is your mood", it would then be the Presence information "Busy").

The Presence criteria defined or selected by the user may be that the Presence information indicates that an entity is at or within a predefined location.

In a second aspect, there is a wireless information device programmed to automatically request Presence information for several entities which meet criteria defined or selected by a user of the wireless information device, the automatic requesting occurring in response to the user singly selecting an option displayed on the device.

A third aspect covers computer software which, when running on a wireless information device, enables the device to automatically request Presence information for several entities which meet criteria defined or selected by a user of the wireless information device, the automatic requesting occurring in response to the user singly selecting an option displayed on the device.

BRIEF DESCRIPTION OF THE DRAWINGS

The invention will be described with reference to the following Figures:
FIG. 9 shows a high level architecture schematic for an implementation of the present invention.

DETAILED DESCRIPTION

An implementation of the present invention is called 'Pinging' and runs on wireless information devices with the Symbian OS from Symbian Limited of London, United Kingdom. The 'Pinging' function is implemented as an application or UI extension to an existing application, such as a contacts or messaging application. It allows a user to select criteria that define entities who will be queried automatically for Presence information by his wireless information device. The user, once he has defined the criteria (e.g. selected a particular group to be queried, such as contacts classed as 'Friends' in his contacts/address book application) then need do no more than select at one time a 'Pinging' function using an on-screen dialog or other menu, which initiates automatic querying across all entities that meet the criteria. There is no need to manually query each member classified as a 'Friend' for its Presence information.

The device can display in effect a series of different lists with selectable items in each list; selecting an item in a list activates that item as a query filter. One list might include all of the available contact categories (close family; extended family; close friends etc.). Another list might include the available moods/activities (in meeting, at work, busy, free for lunch, want to meet up etc.). Another list could include different Presence location parameters referred to as "landmarks" (Home, work, school) plus the option of opening a mapping application that would enable the user to define a location or new landmark. The nature and content of these lists could be altered and augmented to accommodate the different and evolving Presence parameters that can be queried against. In this way, a user could rapidly select the filters to be applied to his Presence search enquiry—e.g. all contacts who are 'Friends' and have selected a 'Let's Party' mood for their Presence. This approach is shown in FIG. 1-8.

Figure 1:
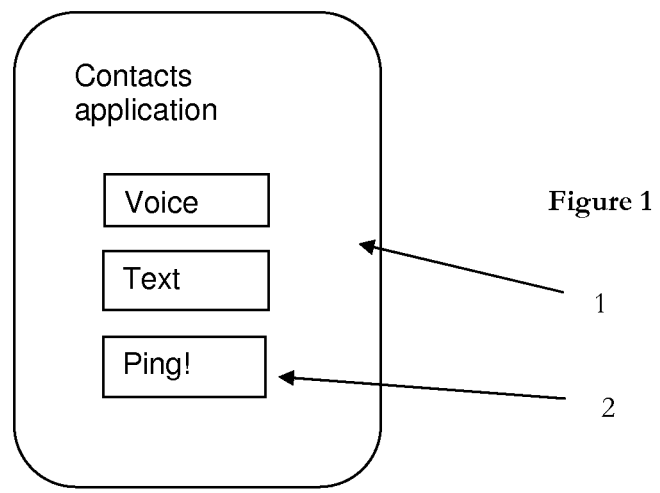
FIGS. 1-8 show a screen from a mobile telephone illustrating the operation of the present invention.
Figure 2:
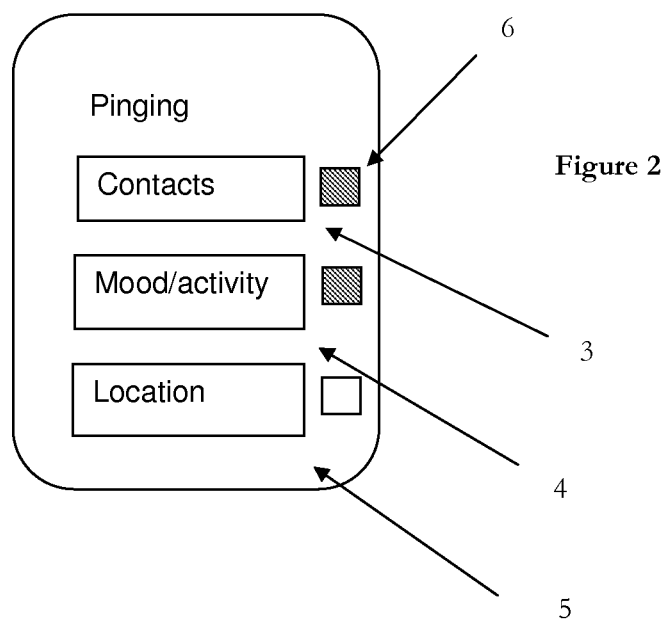
Figure 3:
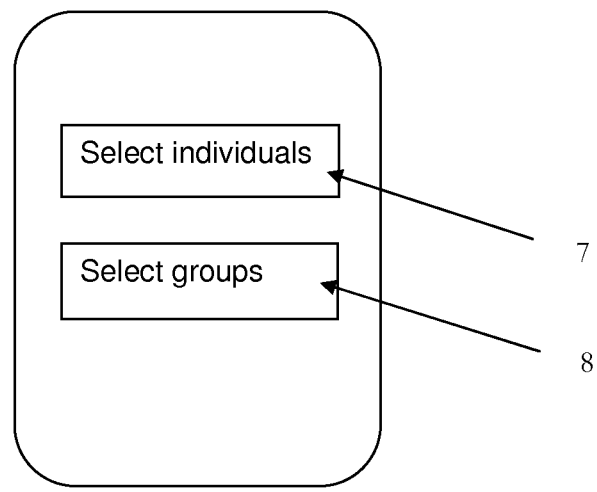
Figure 4:
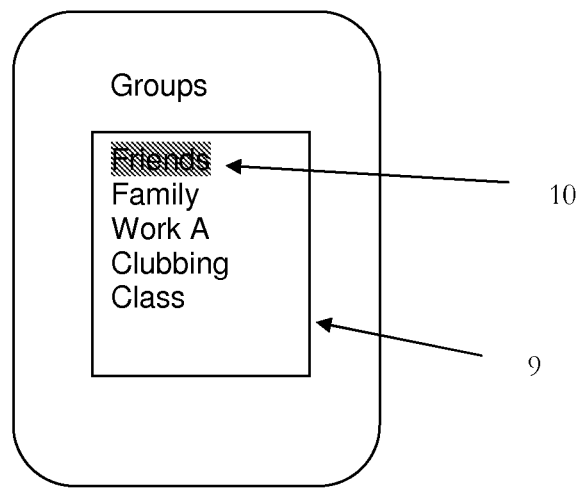
Figure 5:
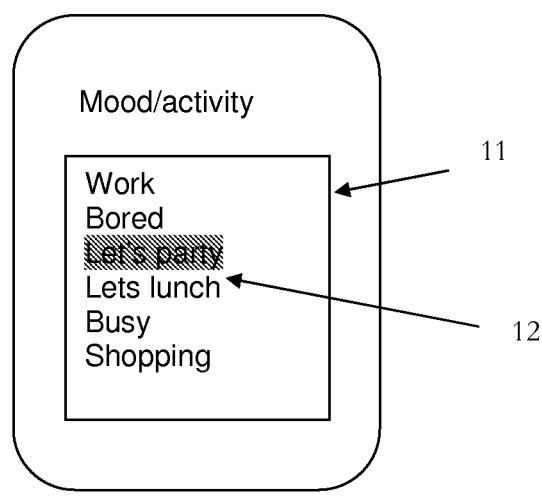
Figure 6:
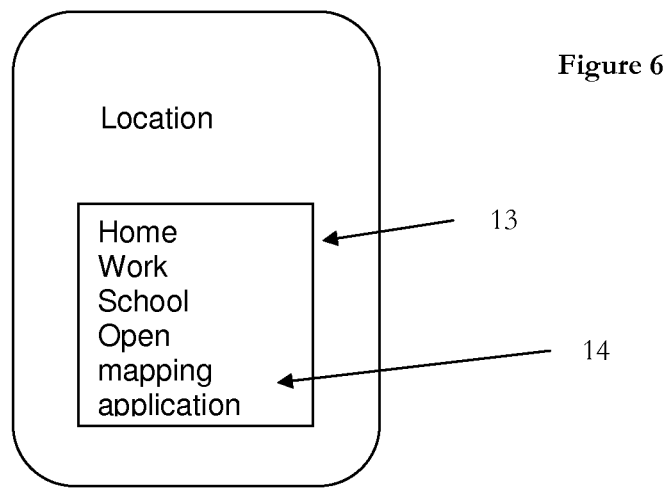
Figure 7:
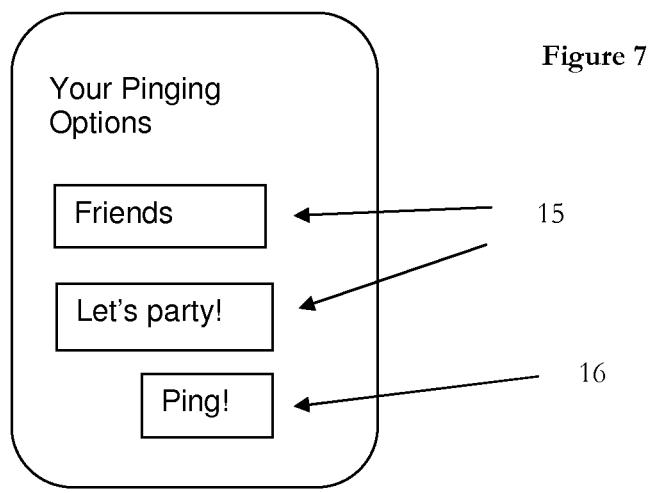

Referring to FIG. 1, the display screen of a wireless information device is shown at 1. The Contacts application is open and options for three possible communication processes are shown, 'Voice', Text, and 'Ping!' at 2. If the user selects the 'Ping!' option 2, then the FIG. 2 screen is generated. It shows three different kinds of criteria or filters that can be applied: 'Contacts' 3, 'Mood/activity' 4 and 'Location' 5. The user has selected the check box 6 for Contacts and also Mood/activity. This causes the device to show, in FIG. 3, the two main ways of selecting contacts: either by selecting them individually 7 (e.g. scrolling through the contacts list and selecting the required contacts one by one) or by selecting a group 8 into which individual have previously been categorised by the user. The 'select Groups' option 8 is selected, leading to the FIG. 4 display, which shows the different kinds of Groups available in a list 9: Friends, family, Work A, Clubbing, Class are featured. The user selects Friends, which is hence highlighted at 10. The device now displays, FIG. 5, the different mood/activity criteria available in list 11: Work, Bored, Let's party, Let's lunch, Busy, Shopping are shown in the list. The user selects 'Let's party' 12, shown highlighted. If the user had also selected the Location pinging filter (FIG. 2), then a list of available location criteria would then be displayed, FIG. 6: Home, work, School are listed in list 13. Also, there is an option to open a mapping application 14 to enable the user to define geographically a location. Because the user had in fact not selected the 'location' Pinging filter, his criteria selection is now complete and is confirmed in the screen shown at FIG. 7, showing that Friends and Let's party are the live filters 15. Critically, there is also displayed a single button labelled 'Ping!' 16. Selection of this button causes the device to automatically establish what entities meet the two criteria of being both in the 'Friends' list of the user and also have themselves posted a 'Let's party' mood. It does this by sending a Presence information request (detailed below) out to the repository of the Presence information of all contacts who are listed as 'friends' in the user's contacts application.

This may be a server based database, programmed to automatically return Presence information to the user's wireless information device (if suitably authorised) when polled or requested by that device.

A peer to peer approach is also possible: the Presence data is then not stored on a central database server and managed centrally by the database server owner (e.g. network operator), but is instead distributed across wireless information devices such that the Presence information for any given user is stored on and managed by software on that user's wireless information device. The software on a device will handle Presence information requests from other users, including filter against Presence related queries from other devices, it will log Presence information requests, may be programmed or otherwise configured by the user to deny/permit requests from given users, will facilitate communication with the entity that has requested Presence information and will generate and display data Presence information requested by other devices. Hence, in the above example, the request for Presence information could be sent out directly to each remote wireless information device controlled by each entity listed as a 'friend', with each device programmed to automatically return Presence information back to the requesting wireless information device when polled or requested if it also matches the 'Let's party' mood.

Hence, actual filtering against the 'Let's party' requirement can take place at the resource which stores the Presence information (e.g. server or wireless information device of the contact being polled), with that resource in effect performing a match against the query represented in a structured query language (e.g. does your Presence information include a 'Lets party' mood); a nil return would be sent to the requesting device (or indeed other server) if there was no match. A 'yes' return would be sent if there was a match. Alternatively, a more general query could be sent by the requesting device (e.g. 'tell me all of your Presence information that I am entitled to see'), with the resource(s) storing the Presence information returning that information and the requesting device itself performing the necessary matching against the user defined criteria.

Figure 8:
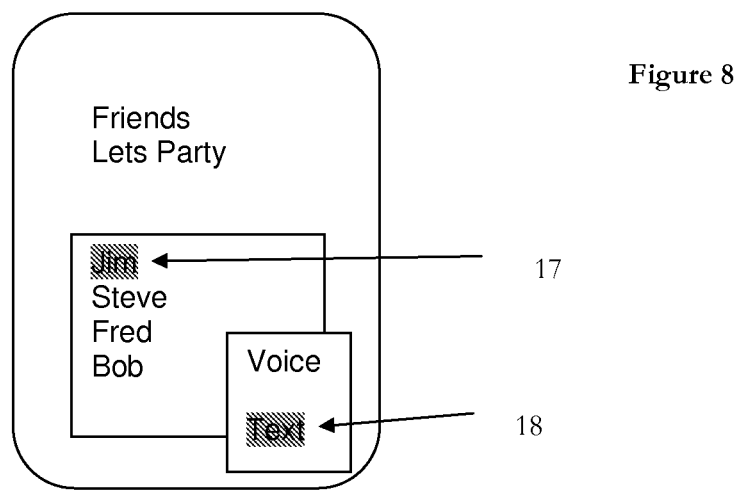

Finally, the Presence information for each entity satisfying the criteria is automatically displayed against their contact record in the contacts application. Alternatively, as shown in FIG. 8, a new table 17 can be generated within the contacts application that lists all of the friends by name that meet the 'Let's party' mood. The user's device also displays a communication dialog window 18 that readily allows the user to select a person from the list and initiate a voice or text communication with him or her. In FIG. 8, the name 'Jim' is shown selected and highlighted: the user can rapidly open up a voice channel or text him using the appropriate options in box 18.

The end result will be that the user is given only the Presence information that he or she is interested in reading. The background process that delivers this may involve querying Presence information of large numbers of entities. The user initiates this by singly (i.e. once only) selecting an option displayed on the device—e.g. after selecting the filters, he or she simply selects a 'Get Presence' or 'Ping!' button (16 in FIG. 7) once only and then, as a background process, Presence information is requested by the device from all applicable entities, compared against the necessary filter criteria and any relevant information displayed. In the example illustrated, that is a list of all 'friends' who are in the 'Let's party' mood. As FIG. 7 shows, the user has simply to select the 'Ping!' button 16 once to initiate the entire process that leads to this.

Another alternative scenario is that a school child might be interested in seeing the Presence of all class mates: he or she simply selects 'class' as a filter (see the options listed at 9 in FIG. 4), selects the option 'Ping!' function 16 and all of the class mates' Presence information is returned for display on his device.

A further useful feature would be to allow the user to set up commonly-used filter "profiles" using the process described above and then to save them for future use. Next time the user wants to find his friends with mood "Let's Party", he need only select the appropriate profile and press the Ping! button.

Because this system is potentially intrusive, it is sensible to build in safeguards against inappropriate use. One safeguard is that the identity of the user requesting access to an entity's Presence information is logged and automatically sent to a wireless information device controlled by that entity or used by that device for display on that device. Logging can be on the data store that stores the Presence information (e.g. a server or on a device itself for a peer to peer approach); it provides an audit trail of who has requested any individual's Presence information and will act as a disincentive to inappropriately requesting someone else's Presence information. In a typical implementation of the present invention, Presence information is stored on server based databases controlled by a wireless network operator; those servers can be programmed to log all access requests to Presence information (e.g. identity of person accessing the Presence information, the nature of Presence information accessed, the time/date of access) and to send that information to the relevant user's wireless information device. That device is then programmed to display the fact that Presence information has been requested or accessed and to give the user the option of viewing the log. The server based databases may be programmed to automatically deny access to Presence information from pre-defined categories of entities (e.g. black-listed persons, entities not listed in the user's contact list stored on the database; commercial organisations etc.), so that it is useful to be able to inform a user not only when Presence information has been accessed, but also when it has been requested and denied.

Presence Architecture

The Presence system architecture will now be discussed in overview. It is typically Client/Server: an Instant Messaging and Presence (IMP) Server holds master copies of Presence information and other 'Personal Data': Personal Data is non transient data (unlike Presence information) which the user wishes to store in a database that can be accessed within user defined access limits (e.g. to defined classes of individuals etc.). Personal data could include such things as: MP3 files; photos; credit card details; date of birth and other auto from fill information; medical records; Agenda; Public PGP key, etc. i.e. file, record and transaction based shared content.

The server listens for client connections and communicates directly with clients and other servers. The server also handles: data storage, user authentication, directory lookups (e.g. LDAP) and Rosters, etc. The server can log all requests for Presence information (e.g. the name of the entity requesting that information, the contact numbers, e-mails etc, the kind of Presence information sought, the time/date of access, whether access was successful or not etc.), perform filtering against structured requests and can send required Presence information (which could be a 'yes' response, or the actual information stored, e.g. a defined mood such as 'Lets party') that matches or satisfies the request parameters back to the client device that requested it.

The client communicates with the IMP server, parses and interprets well-formed XML packets and understands message data types.

Returning to the overall architecture, each user is associated with a single server which receives information for them and from them. But in a typical network, there could be many IMP servers provided by the same operator, with the servers transferring messages and Presence information between themselves and, with the appropriate interoperability standards in place (e.g. SIMPLE), with other external IM and presence systems too. A Client/Server protocol (preferably an open XML-based standard) is employed for communications. This is used for client-server, server-client and server-server communication (session initiation, modification and termination). A server-to-server protocol may also be used—SIP/SIMPLE for interoperability between heterogeneous systems would be a natural design choice.

Data representation protocol: a fundamental requirement of the architecture is that it must be extensible. As such, an open XML-based standard protocol should be used for packaging/transporting data (IM, Presence data and personal information). The protocol should use XML namespaces to encapsulate other kinds of data sent, allowing any client, server, transport, or any component of the architecture to build custom applications by including their own XML data within their namespace. SOAP may be employed. Along with a flexible messaging and presence system, an XML-based directory should be provided. As to account management, the server by default will allow every user to have full control over the creation of and management of their account. This includes passwords, and all presence, personal data and messaging aspects. Server administrators have full control over the rights allotted to each account, and can remove or limit those at any time.

Pinging Architecture

FIG. 9 is a high level schematic of the overall Pinging architecture: the 'Pinging' function is implemented as an application or UI extension to existing applications, such as contacts or messaging 'apps' 23 which can send the their Presence related queries (e.g. "get Presence for Joe and Sally") to a Presence Framework 19 on the client device. The Presence Framework 19 communicates via a local database plugin 21 with a local Presence Data store 22. Presence Framework 19 communicates via network plugin 20 over network 24 either directly to other client devices 26, 27 (if a peer to peer Presence system is used) or with a network Presence Data store 25 for a more conventional client server model.

The invention claimed is:

1. A method comprising:
receiving, at a server, a search request from a first wireless device, the search request comprising at least one pre-defined criterion selected from pre-defined criteria displayed in one or more presence information menu lists shown on a first wireless device;
performing, at the server, a search, based on the search request, of one or more data stores for entities having presence information matching the at least one pre-defined criterion;
providing, from the server, a search result of one or more resulting entities having presence information matching the at least one pre-defined criterion to said first wireless device;
logging, at the server, an identification and the search request of the first wireless device from which the search request is received to maintain an audit trail of search requests, including automatic denials to search requests from pre-defined categories of entities; and
sending, from the server, the identification of the first wireless device and the search request to each of the resulting entities having presence information matching the at least one pre-defined criterion of the search request,
wherein, in addition to the at least one pre-defined criterion, the search request comprises one or more free scripted queries to be interpreted by a search engine using artificial intelligence.

2. The method of claim 1, wherein at least one of the pre-defined criteria comprises a pre-defined group of contacts.

3. The method of claim 1, wherein a group of several, linked criteria can be stored as a profile for future re-use.

4. The method of claim 1, wherein the presence information is stored at a database, programmed to automatically respond when polled or requested by the wireless device.

5. A server comprising:
a memory configured to store program code; and
a processor configured to, when executing the program code, cause the server to:
receive a search request from a first device, the search request comprising at least one pre-defined presence information criterion selected from pre-defined presence information criteria displayed in one or more presence information menu lists shown on the first device;
perform a search, based on the search request, of one or more data stores for entities having presence information matching the at least one pre-defined criterion;
send to the first device a search result of one or more resulting entities having presence information matching the at least one pre-defined criterion on the first device;
log an identification and the search request of the first device from which the search request is received to maintain an audit trail of search requests, including automatic denials to search requests from pre-defined categories of entities; and
send the identification of the first device and the search request to each of the resulting entities having presence information matching the at least one pre-defined criterion of the search request,
wherein, in addition to the at least one pre-defined criterion, the search request comprises one or more free scripted queries to be interpreted by a search engine using artificial intelligence.

6. The server of claim 5, wherein at least one of the pre-defined criteria comprises a pre-defined group of contacts.

7. The server of claim 5, wherein a group of several, linked criteria can be stored as a profile for future re-use.

8. The server of claim 5, adapted to:
communicate with a database, wherein the presence information for one or more entities is stored in a data store of the server database; and
send the search request to the database.

9. The server of claim 5, programmed to determine the search result from presence information for one or more entities stored in a data store.

10. The server of claim 5, wherein a server based data store storing presence information for one or more entities determines the search result.

11. The server of claim 5, wherein the pre-determined criteria can be saved and re-used at a later time.

12. A non-transitory computer readable storage medium with an executable program stored thereon, wherein the program instructs a microprocessor, running on a server, to cause the server to:
- receive, from a wireless information device, a search request comprising at least one pre-defined criterion selected from pre-defined criteria displayed in one or more presence information menu lists shown on the wireless information device,
- perform a search, based on the search request, of one or more data stores for entities having presence information matching the selection of at least one pre-defined criterion from the pre-defined criteria;
- provide to the wireless information device a search result from the one or more data stores comprising one or more resulting entities having presence information matching the at least one pre-defined criterion;
- log an identification and the search request of the wireless information device from which the search request is received to maintain an audit trail of search requests, including automatic denials to search requests from pre-defined categories of entities; and
- send the identification of the first wireless information device and the search request to each of the resulting entities having presence information matching the at least one pre-defined criterion of the search request,
- wherein, in addition to the at least one pre-defined criterion, the search request comprises one or more free scripted queries to be interpreted by a search engine using artificial intelligence.

\* \* \* \* \*